United States Patent [19]

Juri et al.

[11] Patent Number: 4,691,329

[45] Date of Patent: Sep. 1, 1987

[54] BLOCK ENCODER

[75] Inventors: Tatsuro Juri, Hirakata; Akira Iketani, Higashiosaka; Chojuro Yamamitsu; Akifumi Ide, both of Kawanishi, all of Japan

[73] Assignee: Matsushita Electric Industrial Co., Ltd., Osaka, Japan

[21] Appl. No.: 880,992

[22] Filed: Jul. 1, 1986

[30] Foreign Application Priority Data

Jul. 2, 1985 [JP] Japan ................................. 60-143914
Jul. 19, 1985 [JP] Japan ................................. 60-160598

[51] Int. Cl.⁴ .......................... H04N 1/40; H04N 7/12
[52] U.S. Cl. .................................... 375/122; 358/133; 358/136; 382/43; 382/56
[58] Field of Search ............... 358/133, 135, 136, 138, 358/260; 370/118; 371/37, 39, 40; 375/122; 382/9, 41, 43, 50, 56

[56] References Cited

U.S. PATENT DOCUMENTS

| 4,134,134 | 1/1979 | Lux | 382/43 |
| 4,447,886 | 5/1984 | Meeker | 382/43 |
| 4,541,012 | 9/1985 | Tescher | 358/135 |
| 4,606,069 | 8/1986 | Johnsen | 382/56 |
| 4,633,326 | 12/1986 | Endoh et al. | 358/260 |

Primary Examiner—Benedict V. Safourek
Attorney, Agent, or Firm—Spencer & Frank

[57] ABSTRACT

A block encoder comprises first block generating means for constituting a three-dimensional large-size block, and a plurality of second block generating means for dividing the large size block into small size blocks. The small size blocks of two dimensions and three dimensions are changed over adaptively in dependence on image information.

9 Claims, 18 Drawing Figures

| IMPROVEMENT FACTOR 1 | SELECTION OF b-TYPE SMALL BLOCK |
|---|---|
| | +15  +10  +3  +3  +1  −5  −7 |
| IMPROVEMENT FACTOR 2 | +5  +5  +4  +2  +2  −1  −3 |
| | SELECTION OF e-TYPE SMALL BLOCK |

(2)

| IMPROVEMENT FACTOR 1 | SELECTION OF b-TYPE SMALL BLOCK |
|---|---|
| | +5  +2  +1  −2  −5  −11  −13 |
| IMPROVEMENT FACTOR 2 | +5  +5  +4  +2  +2  −1  −3 |
| | SELECTION OF e-TYPE SMALL BLOCK |

(3)

| IMPROVEMENT FACTOR 1 | SELECTION OF b-TYPE SMALL BLOCK |
|---|---|
| | +15  +10  +3  +3  +1  −5  −7 |
| IMPROVEMENT FACTOR 2 | +4  +2  +2  −1  −3  −5  −18 |
| | SELECTION OF e-TYPE SMALL BLOCK |

BLOCK ENCODER

BACKGROUND OF THE INVENTION

The present invention concerns with a high-efficiency compression coding of digital image information or data.

The information coding intended for improving or enhancing the efficiency of transmission by reducing the redundancy of the information such as video or the like information is known as a high-efficiency compression coding. One of the methods of realizing the compression coding resides in a block encoding in which a predetermined number of samples of image information is collected or grouped in a unit referred to as the block, wherein the compression of the samples is performed within each block. As typical ones of the block encoding, there can be mentioned an orthogonal transformation technique in which the samples within each block undergo the orthogonal transformation to be subsequently quantized and a vector quantization technique in which the samples are straightforwardly quantized on the block-by-block basis. In both of the coding techniques mentioned above, samples are compressed by taking advantage of strong or intensive correlation existing between the adjacent image samples. It is thus preferred that the samples within the block are located mutually as close as possible.

Figure 13A:
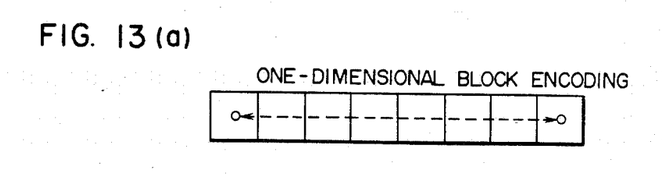
FIGS. 13(a) to 13(c) are diagrams for illustrating the principle of the block encoding.
Figure 13B:
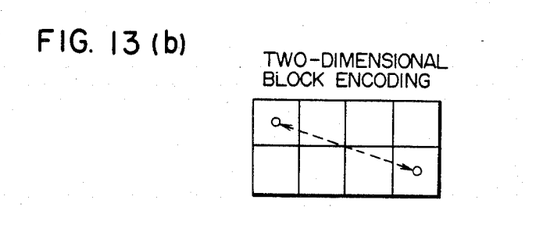
Figure 13C:
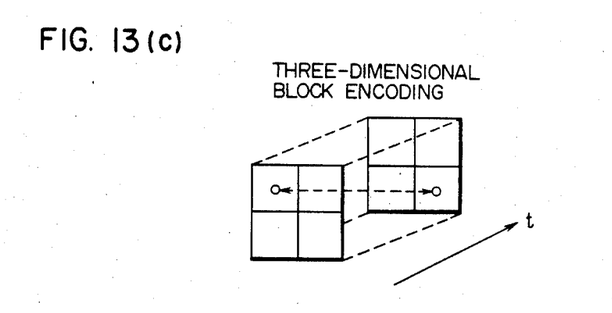

By way of example, a block encoding method according to which each block is composed of eight samples will be considered below. FIG. 13(a) of the accompanying drawings illustrates a one-dimensional block encoding method. It will be seen that the samples located at opposite ends are distance significantly from each other. In constant, in the case of a two-dimensional block encoding method illustrated in FIG. 13(b), the distance between the samples located at the opposite ends is appreciably shortened. Additionally, for the image information exhibiting continuity also in the direction along the time axis such as television (TV) signal, the distance between the samples located at the opposite ends can further be reduced by applying a three-dimensional block encoding technique illustrated in FIG. 13(b). To say in another way, the two-dimensional or three-dimensional block encoding of image information can realize the compression of the samples within a block at a very high ratio when compared with the one-dimensional block encoding.

Next, description will be made of the orthogonal transformation by taking as an example the Hadamard transformation which is a typical one of the orthogonal transformations and facilitates hardware implementation.

In the first place, samples are divided or grouped into blocks each including eight samples located adjacent to one another. According to the Hadamard transformation, a given block is represented by $X=(x_1, x_2, \ldots, x_8)$ and subjected to the transformation mentioned below to obtain orthogonal sequency $Y=(y_1, y_2, \ldots, y_8)$. Namely, $$Y = H \cdot X \quad (1)$$

where H is represented by the following matrix referred to as the Hadamard matrix.

$$H = \frac{1}{\sqrt{8}} \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad (2)$$

Reversely, the original information X can be reconstituted or regenerated when the orthogonal sequency or component Y is subjected to an inverse transformation given by $$X = H^{-1} \cdot X = H \cdot X \quad (3)$$

In general, after the orthogonal transformation, remarkable differences in energy level make appearance among the individual orthogonal sequencies $Y=(y_1, y_2, \ldots, y_8)$. Under the circumstance, a greater number of bits are allocated to the orthogonal sequency or component having a high energy level while a smaller number of bits are allocated to the orthogonal component of low energy level, to thereby make it possible to reduce the number of bits as a whole.

In the high-efficiency compression coding briefed above, the two-dimensional or three-dimensional block encoding is generally adopted. In the case of the two-dimensional block encoding, however, remarkable distortion may occur when the samples of image information within a block vary significantly in respect to magnitude, because then the correlation between the samples is correspondingly reduced or enfeebled.

In contrast, in the case of the three-dimensional block encoding, the correlation in the direction along the time axis can be held very high since the samples of image information vary little in that direction, which in turn means that a higher compression of the sampled data can be accomplished when compared with the two-dimensional block encoding. However, when the data samples exhibit significant diversity in magnitude in the time axis direction (i.e. in the direction coinciding with the time axis or base), correlation in that direction will be lost to a significant extent, giving rise to a problem that remarkable distortion takes place to a disadvantage.

Next, the difficulties accompanying the block encoding will be elucidated in conjunction with the one-dimensional eighth-order Hadamard transformation.

FIG. 14(a) of the accompanying drawings shows a sequence of sampled values of image information. As will be seen in the figure, the sampled value rises up steeply at a time point T. When the image information of this sort is subjected to the orthogonal transformation, concentration of energy occurs at a particular orthogonal sequency component, involving remarkable distortion. Upon the inverse transformation, the distortion will be dispersed among all the samples in an associated block, as a result of which the regenerated or decoded image information suffers remarkable distortion undesirably as illustrated in FIG. 14(b) where an extremely large peak value makes appearance, whereby the visual quality of the resulting image is remarkably degraded. As will now be appreciated, the orthogonal transformation applied to the image information in which steep or non-smooth variation occurs between the adjacent samples results in a great degradation in the quality of the reproduced image.

SUMMARY OF THE INVENTION

It is an object of the present invention to provide a three-dimensional block encoder apparatus in which distortion can be suppressed to a minimum even in the processing of a three-dimensional image information exhibiting no correlation in the time-axis direction.

In view of the above and other objects which will become more apparent as description proceeds, there is provided according to an aspect of the present invention a block encoder which comprises first block generating means for generating large-size blocks each composed of N samples by dividing a three-dimensional image in a three-dimensional manner, K varieties of second block generating means for dividing each of the large size blocks obtained by the first block generating means into small size blocks, block encoding means for generating K sets of block code words by block-encoding each of K sets of small-size blocks obtained through the second block generating means, selecting means for selecting one set of the block code words from K sets of the block code words obtained through the block encoding means, and transmitting/identifying means for transmitting the set of the block code words selected by the selecting means to receiver means and informing said receiver means of that second block generating means which generates the transmitted set of the block code words.

The above and other objects, advantages and features of the present invention will be fully understood upon consideration of the following description of the preferred embodiments taken in conjunction with the drawings.

BRIEF DESCRIPTION OF THE DRAWINGS

FIGS. 14(a) and (b) are waveform diagrams for illustrating a hitherto known block encoding.

DESCRIPTION OF THE PREFERRED EMBODIMENTS

Figure 1:
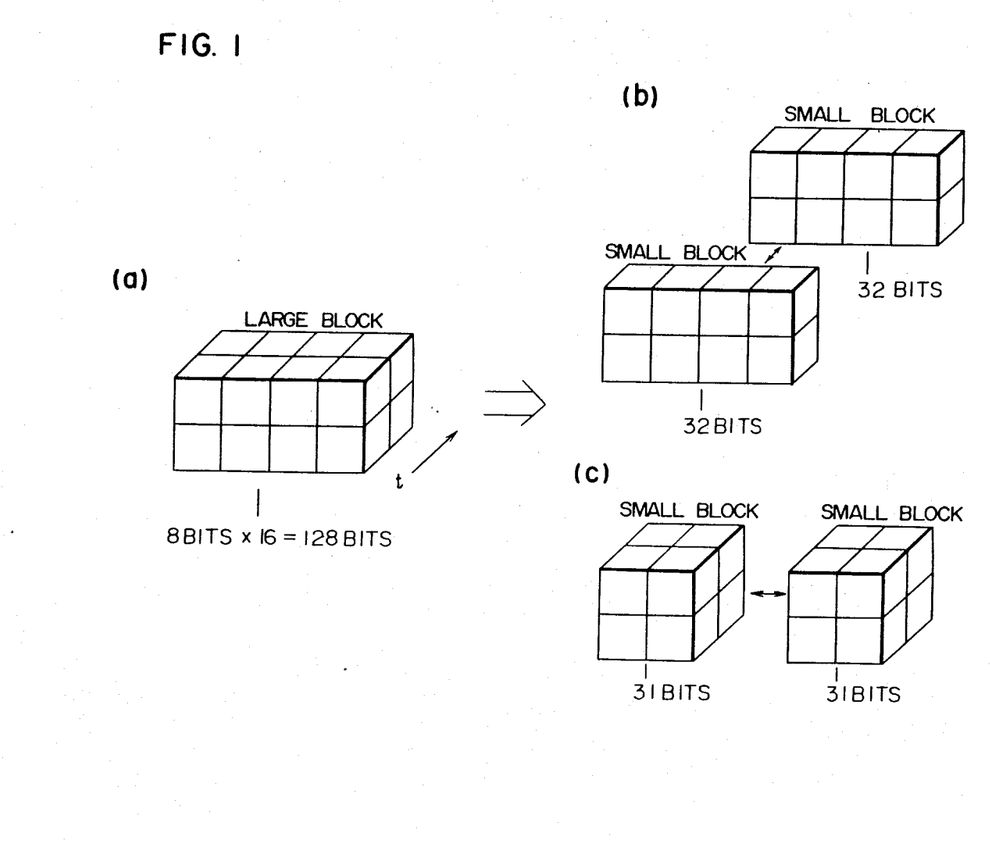
FIG. 1 is a schematic diagram for illustrating a procedure for block-encoding of information or data samples according to a first exemplary embodiment of the present invention.

Now, the invention will be described in detail in conjunction with exemplary embodiments thereof. Referring to FIG. 1, a large-size block generated by a first block generating means according to a first embodiment of the present invention is shown at (a). This large-size block is composed of 16 samples in total (i.e. N=16) including 2 samples in the vertical direction, 4 samples in the transverse direction and 2 samples in the time-axis direction. In FIG. 1, there is illustrated at (b) a manner in which the large-size block shown at (a) is divided into two varieties (i.e. K=2) of small-size blocks through second block generating means. As will be seen in FIG. 1 at (b), the large-size block shown at (a) is divided into two-dimensional blocks (covered by the concept "small-size block") each composed of 8 samples. In contrast, in the case of the example illustrated at (c), the large-size block is divided into three-dimensional blocks (also encompassed by the concept "small-size block") each composed of 8 samples.

Figure 2:
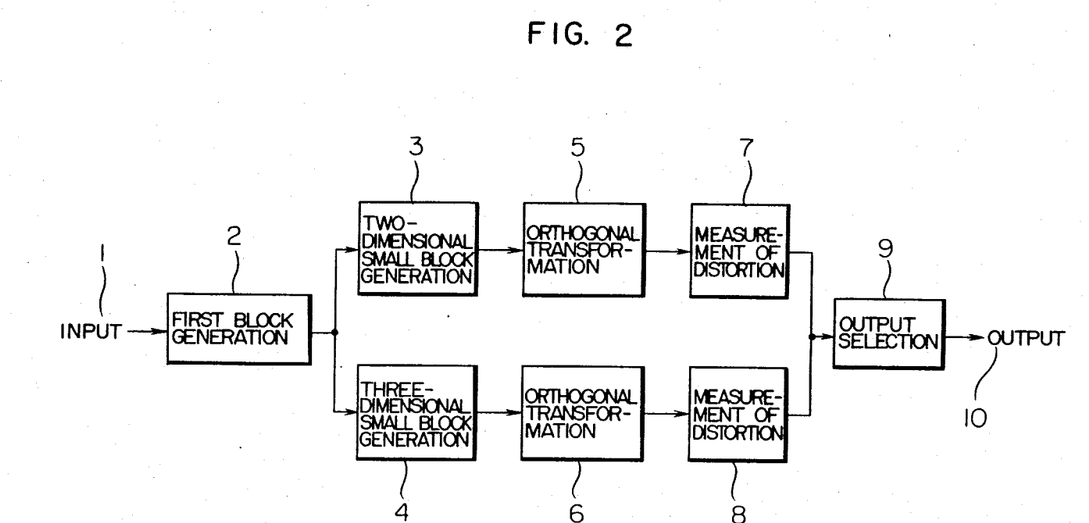
FIG. 2 is a block diagram showing a general arrangement of a block encoder for carrying out the block encoding according to the first embodiment.

FIG. 2 shows in a block diagram a block encoder apparatus for carrying out the block encoding according to the first embodiment of the invention. In FIG. 2, a reference numeral 1 denotes an input side, 2 denotes a first block generator unit, 3 denotes a two-dimensional small block generating unit, 4 denotes a three-dimensional small block generating unit, 5 and 6 denote orthogonal transformation coder units, respectively, 7 and 8 denote distortion measuring units, respectively, 9 denotes an output selector unit, and 10 designates the output side of the apparatus.

Samples each of eight bits as supplied to the inlet or input 1 are collected or grouped in a large-size block by the first block generator unit 2, whereby large-size block such as illustrated in FIG. 1 at (a) is generated. The large-size blocks thus generated are then inputted to the two-dimensional small-size block generating unit 3 and the three-dimensional small-block generating unit 4, respectively, to be divided into the small-size blocks illustrated in FIG. 1 at (b) and (c), respectively. Both the two-dimensional small-blocks generated by the unit 3 are encoded through the orthogonal transformation by the orthogonal transformation coder unit 5 to be transformed to code words each of 32 bits, thus resulting in generation of the code words of 64 bits in total. In this connection, it is to be noted that the encoding is so performed that at least one of two leading bits of the 64-bit word string assumes the value not equal to zero "0".

In a similar manner, two three-dimensional small blocks generated by the three-dimensional small-block generating unit 4 are encoded through orthogonal transformation by the orthogonal transformation coder 6 to be transformed to the code words each of 31 bits. The code word string of 62 bits in total thus generated is added with 2 bits each of "0" at the two most significant bit positions, to thereby constitute a code word string of 64 bits in total. For the code word strings each of 64 bits thus generated, magnitude of distortion is arithmetically determined by means of the distortion measuring units 7 and 8, respectively. The distortion thus determined are then compared with each other by the output selector unit 9 which selects out the code word string suffering less distortion to be subsequently outputted as indicated at 10.

As will be appreciated from the above description, the compression coding of the 128-bit (16 samples×8 bits) image information to the 64-bit information can be accomplished. Upon decoding, it is determined whether both of the first two bits of the 64-bit string are "Os". If so, this means that the information has been coded in the three-dimensional block. Otherwise, the 64-bit string information is decided as having been coded in the two-dimensional block. Thus, the decoding can be executed definitely in a much simplified manner.

In the compression encoder apparatus described above, the three-dimensional block encoding is applied to the image whose samples exhibit intensive or strong correlation in the time axis direction as with the case of a still picture information, while the two-dimensional block encoding is applied to the image in which correlation between the samples in the time-axis direction is feeble as with the case of a motion picture information. As the result, the compression encoding can be accomplished at a high compression ratio without suffering any appreciable distortion. Further, since the information identifying the block encoding which has been selected is not required to be transmitted additionally or separately, degradation of the compression ratio due to the transmission of such information otherwise required can be prevented.

Next description will be made on a block encoder according to a second embodiment of the invention.

Figure 3:
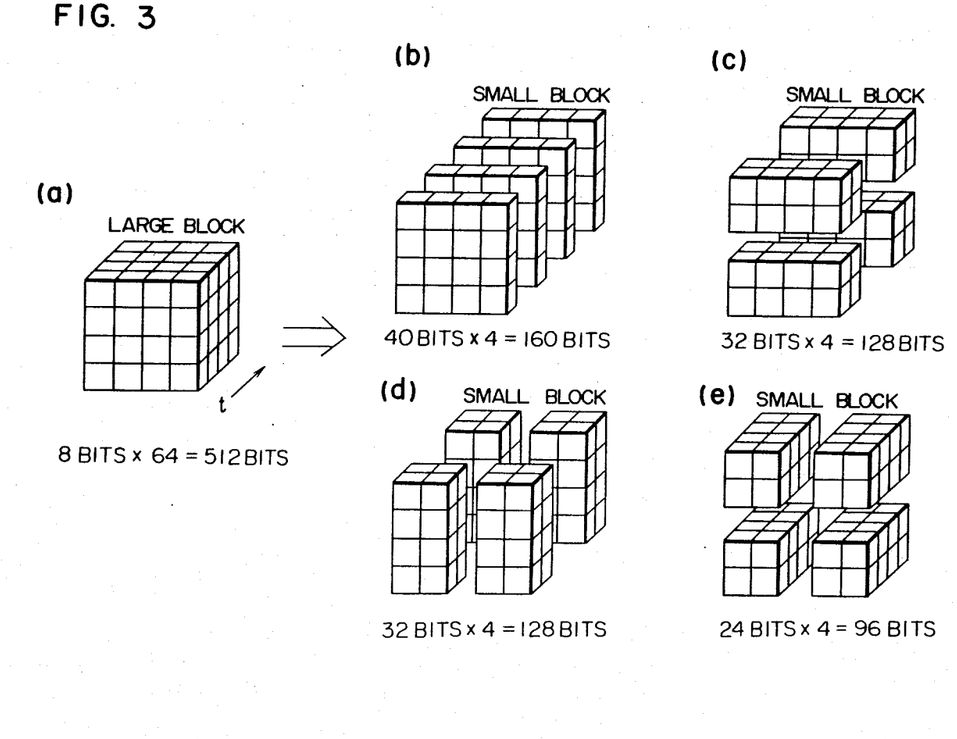
FIG. 3 is a diagram for illustrating a procedure for block-encoding of information or data samples according to a second embodiment of the invention.

Referring to FIG. 3, there is shown at (a) a large-size block composed of 64 samples in total including 4 samples in the vertical direction, transverse direction and in the time-axis direction, respectively. Since it is assumed that one sample consists of 8 bits, the large-size block is composed of 512 bits in total.

Further, there are illustrated four varieties of small-size block generations through four types of second block divisions in FIG. 3 at (b), (c), (d) and (e), respectively. More specifically, each of the small-size blocks shown at (b) has a length corresponding to one sample in the time-axis direction. The small-size blocks shown at (c) and (d) are, respectively, of a length corresponding to two samples in the time-axis directions. Finally, each of the small-size blocks shown at (e) has a length corresponding to four samples in the time-axis direction. The small-size block generations illustrated at (b), (c), (d) and (e) will be hereinbelow referred to as the b-type block division, c-type block division, d-type block division and the e-type block division, respectively. These small-size blocks are encoded through orthogonal transformation on the block-by-block basis, as the result of which the one-large-size block shown at (a) is compressed to 40 bits×4=160 bits in the case of the b-type block division, 32 bits×4=128 bits in the case of the c-type and d-type block divisions, and 24 bits×4=96 bits in the case of the e-type block division. According to this embodiment, one code word is selected from the four varieties of the code words resulting from the orthogonal transformation and transmitted together with information (of 2 bits) indicative of the selected code word.

Figure 4:
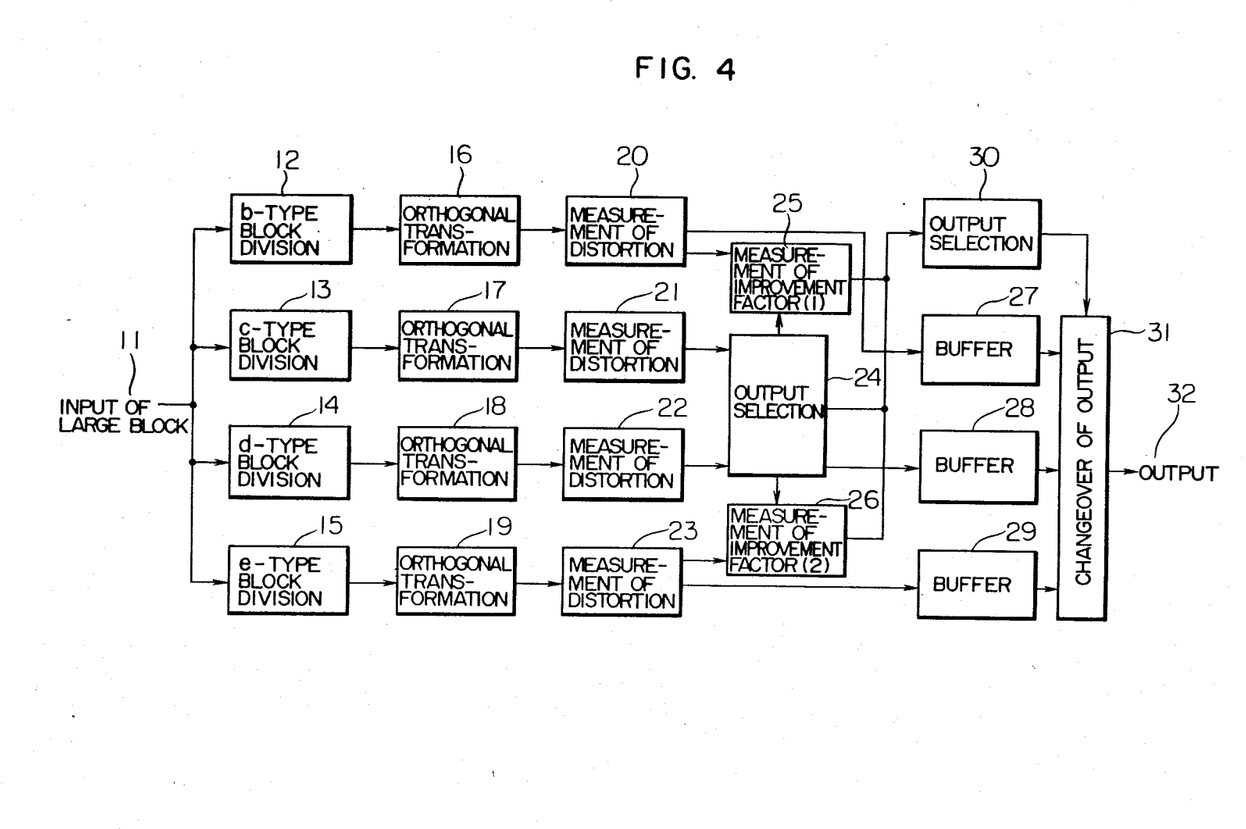
FIG. 4 is a block diagram showing a general arrangement of a block encoder for carrying out the block encoding according to the second embodiment.

FIG. 4 shows in a block diagram an arrangement of the encoder apparatus for carrying out the processing according to the second embodiment mentioned above. In the figure, a reference numeral 11 denotes a large-size block input, 12 denotes a b-type block division unit, 13 denotes a c-type block division unit, 14 denotes a d-type block division unit and 15 denotes an e-type block division unit. Further, reference numerals 16 to 19 denote orthogonal transformation code units, respectively, 20 to 23 denote distortion measuring units, respectively, 24 denotes an output selection unit, 25 and 26 denote units for measuring improvement factors (1) and (2), respectively, 27 to 29 denote buffers, respectively, 30 denotes an output selector unit, and a numeral 31 denotes an output change-over unit. Finally, a reference numeral 32 denotes a code word output.

The samples of the input large-size block 11 composed of 512 bits (=8 bits×64) is supplied to the b-type to e-type block division units 12 to 15, respectively, wherein the resulting small-size blocks are coded by the orthogonal transformation coders 16 to 19, respectively. Accordingly, the code word derived from the b-type block division consists of 160 bits, the code words derived from the c-type and d-type block division each include 128 bits and the code word resulting from the e-type block division includes 96 bits.

The distortion measuring units 20 to 23 calculate magnitudes of distortion brought about by the coding through the associated orthogonal transformation units 16 to 19, respectively. The code words resulting from the c-type block division and the d-type block division are then inputted to the output selection unit 24, wherein the code word suffering less distortion is selected from both the input code words. At the same time, the improvement factor (1) measuring unit 25 produces a signal representative of the difference resulting from subtraction of the magnitude of distortion determined by the measuring unit 20 from the magnitude of distortion of the code word selected by the output selection unit 24. In a similar manner, the improvement factor (2) measuring unit 26 operates to subtract the magnitude of distortion determined by the distortion measuring unit 23 from that of the code word selected by the output selection unit 24.

Figure 5:
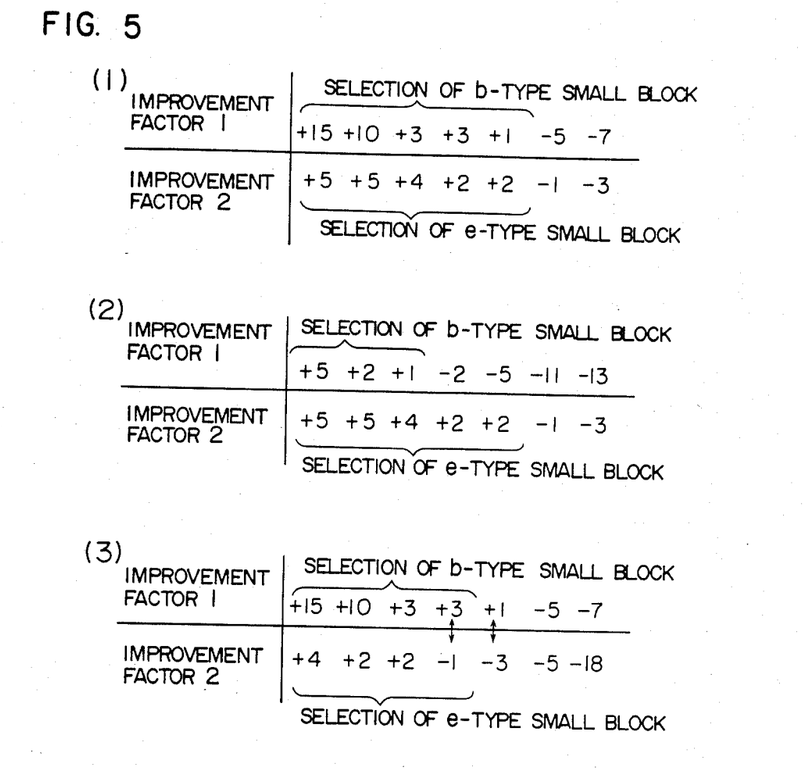
FIG. 5 is a diagram for illustrating block-selecting operation in the second embodiment.

The three varieties of code words (i.e. outputs of the units 20, 23 and 24) thus obtained are stored in the associated buffers 27, 29 and 29, respectively. On the other hand, the output selection unit 30 serves to array the output information of the improvement factor (1) measuring unit 25 and the improvement factor (2) measuring unit 26 in the order of magnitudes as illustrated in FIG. 5 at (1). In this connection, the plus (+) sign attached to the values of the improvement factors (1) and (2) means that the distortion of the code word resulting from the b-type or c-type block division is smaller than that of the code word selected by the output selection unit 24. In the case where both the improvement factors (1) and (2) derived from the same block are positive (i.e. of plus sign), the improvement factor of larger magnitude is allowed to remain in the table with the other being eliminated. When the number of the improvement factors (2) having positive values is equal to or greater than that of the improvement factors (1) of positive values, the code word resulting from the b-type block division is selected for the block having the improvement factors (1) of positive values, while the code word resulting from the e-type block division is selected for the block having the improvement factor (2) of positive value, as illustrated in FIG. 5 at (1) and (2). On the other hand, when the number of the improvement factors (1) having the positive values is greater, the code words resulting from the b-type and e-type block divisions, respectively, are selected for the range in which the sums of the values of improvement factors (1) and (2) are positive, as illustrated at (3) in FIG. 5. For the other blocks, the code word derived from the c-type or d-type block division is selected by the output selection unit 24. Through the output selection mentioned above, the number of times the code word derived from the e-type block division (having the code length of 96 bits) is selected becomes equal to or greater than the number of times the code word resulting from the b-type block division (having the code length of 160 bits) is selected. Since the code words resulting from the c-type and d-type block divisions are of 128 bits in length, the overall code length will not exceed 128 bits on an average.

The outputs of the buffers 27 to 29 are changed over by the output change-over unit 31 in the manner described above and outputted together with the selected output identifying information (which is composed of 2 bits because of the 1-out-of-4 selection from four varieties of outputs), as indicated at 32 in FIG. 4.

The encoder apparatus according to the second embodiment of the invention mentioned above is capable of compressing 512 information bits to 130 bits (i.e. with a compression ratio of about $\frac{1}{4}$) and can be advantageously applied for compressing information of the still picture as well as the motion picture with an improved efficiency.

As will now be appreciated from the foregoing description, the present invention has provided a three-dimensional block encoder apparatus which is applicable to the image information having intensive correlation in the time-axis direction as well as the image information having feeble correlation in the time-axis direction and which can perform the high-efficiency coding of the still picture information as well as motion picture information with a high compression ratio, assuring thus an improved image quality. It will be apparent that the invention is never restricted to the illustrative embodiments described above, but various modifications and changes are possible. For example, the first and/or second block encoding or division can be carried out with a given number of the samples and the blocks of given forms. Further, the compression ratio can be selected arbitrarily. Although it has been assumed in the foregoing description that the orthogonal transformation is employed, it will be understood that the invention can be equally applied to the case where the vector quantization is adopted.

Next, description will be directed to a filtering means or filter which can be disposed in precedence to the block encoding according to the invention for the purpose of reducing the distortion which the block suffers.

Figure 6:
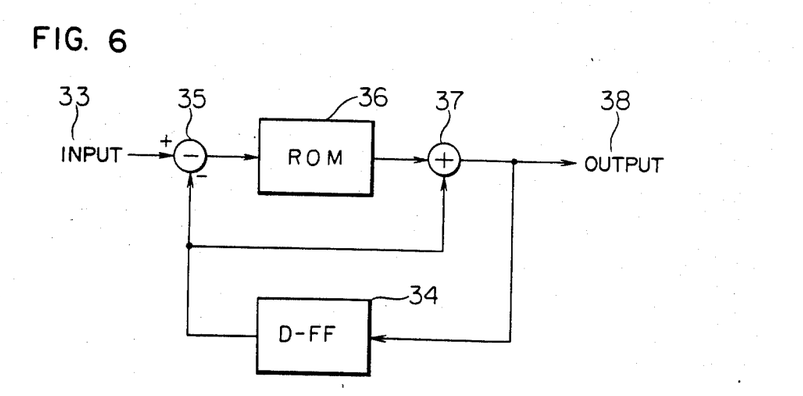
FIG. 6 is a schematic circuit diagram of a filter employed according to another embodiment of the invention.

FIG. 6 shows an exemplary embodiment of the filtering device. In the figure, a reference numeral 33 denotes an input unit of the device, 34 denotes a D-type flip-flop, 35 denotes a subtractor, 36 denotes a read-only memory (ROM), 37 denotes an adder, and a numeral 38 denotes an output unit.

Contents of the ROM 36 can be defined as follows:

$$\text{When } Ad \leq -L, R(Ad) = -L \quad (1)$$

$$\text{When } -L < Ad < L, R(Ad) = Ad \quad (2)$$

$$\text{When } L \leq Ad, R(Ad) = L \quad (3)$$

In the above expressions, Ad represents the address of the ROM, and R(Ad) represents the output of the ROM when the address Ad is selected. Further, L represents a constant of a natural number defining the filtering characteristic.

Operation of the filtering device will be described below.

Representing the sample value inputted from the input unit 33 at a time point t by St with the content of the D-type flip-flop 34 represented by Dt, the output of the subtractor 35 is given by $St - Dt$. Since the output of the subtractor 35 represents directly the address of the ROM 36, the output of the ROM is expressed in accordance with the conditions (1), (2) and (3) as follows:

$$\text{When } St - Dt \leq -L; -L \quad (4)$$

$$\text{When } -L < St - Dt < L; St - Dt \quad (5)$$

$$\text{When } L \leq St - Dt; L \quad (6)$$

The output of the ROM 36 is added with the output Dt of the D-type flip-flop 34 through the adder 37, the results of which can be given in accordance with the expressions (4), (5) and (6) as follows:

$$\text{When } St - Dt \leq -L; Dt - L \quad (7)$$

$$\text{When } -L < St - Dt < L; St \quad (8)$$

$$\text{When } L \leq St - Dt; Dt + L \quad (9)$$

The output of the adder 37 is supplied to the output unit 38 and the D-type flip-flop 34.

Accordingly, when the difference between St and Dt is smaller than L in the expression (8), the original sample value St is inputted to the output unit 38 and the D-type flip-flop 34, resulting in that $D_{t+1} = St$. In this manner, so long as the variation among the samples remains small (i.e. when the difference to the preceding sample is smaller than L), the inputted sample value is outputted as it is. To the contrary, when the variation among the samples is great (i.e. when the difference relative to the preceding sample is greater than L), the value of L is limited to the difference relative to the preceding sample.

Figure 7A:
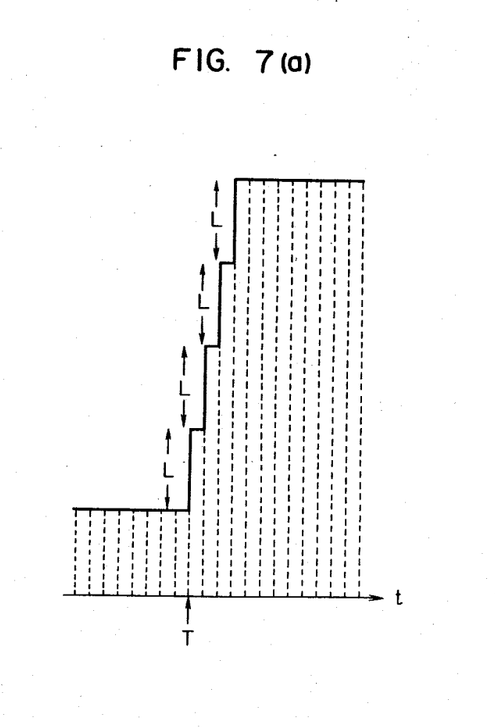
FIGS. 7(a) and 7(b) are waveform diagrams for illustrating operation of the filter shown in FIG. 6.
Figure 7B:
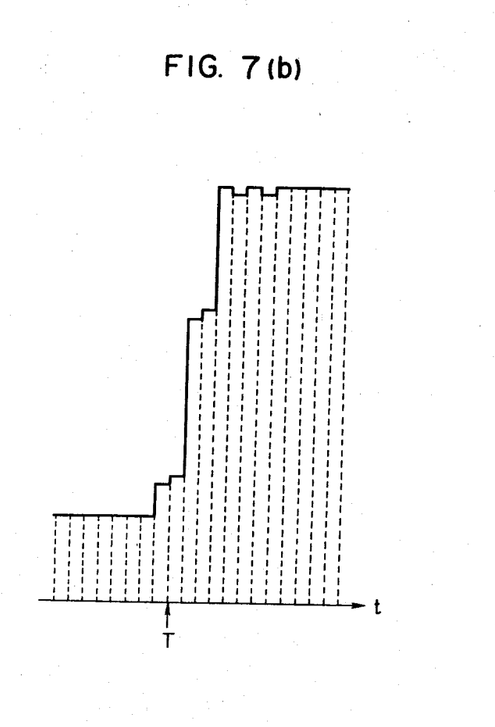
Figure 14:
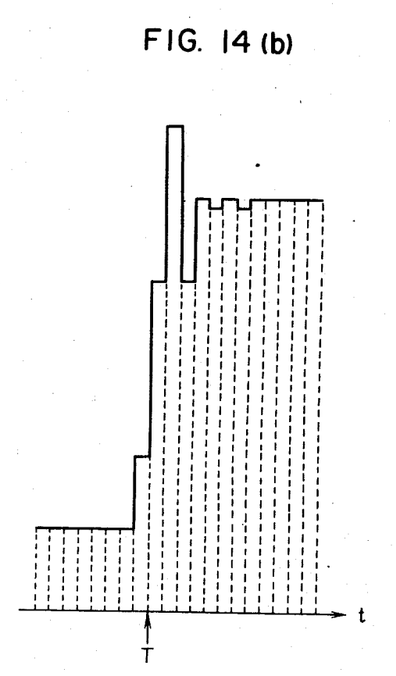

The result obtained from the operation of the filtering device shown in FIG. 6 on the sample values shown in FIG. 14 at (a) inputted thereto is illustrated in FIG. 7 at (a). Further, the sample values obtained through reverse transformation of the data resulting from the orthogonal transformation of the output of the device shown in FIG. 6 are illustrated in FIG. 7 at (b). As will be seen from the diagram shown in FIG. 7 at (b), the peak of distortion present in the waveform shown in FIG. 14 at (b) is suppressed. In this manner, when the distortion makes appearance as concentrated to the location where the sample values undergo variation and when the variation of the successive sample values is smooth, distortion is less susceptible to be perceived visually, whereby the image quality can be significantly improved.

It should further be added that when the variation in the sample values remains small, the filter shown in FIG. 6 outputs the original sample values as they are. Accordingly, degradation in the resolution of image due to the filtering operation can be essentially evaded.

Figure 8:
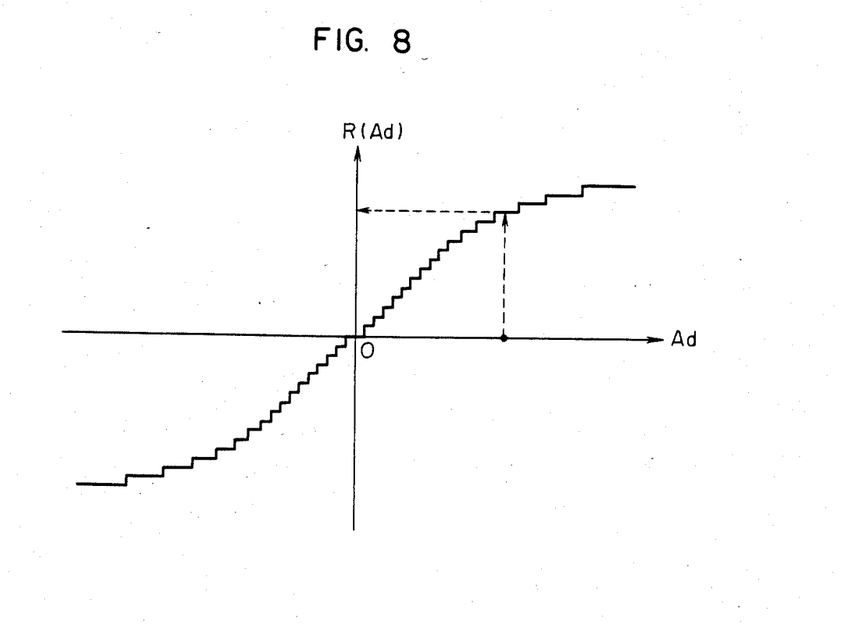
FIG. 8 is a view for graphically illustrating characteristics of a ROM (read-only memory) constituting a part of the filter shown in FIG. 6.

As will now be understood, by adopting the filtering operation by the filter shown in FIG. 6 in precedence to the block encoding processing, the visual image quality can be improved significantly. The device shown in FIG. 6 can be implemented in a facilitated manner. Besides, the device is not accompanied with any appreciable time lag and can be used for the real-time processings. The characteristics of the ROM 5 shown in FIG. 6 defined by the expressions (1), (2) and (3) may be changed to non-linear characteristics such as illustrated in FIG. 8.

Figure 9:
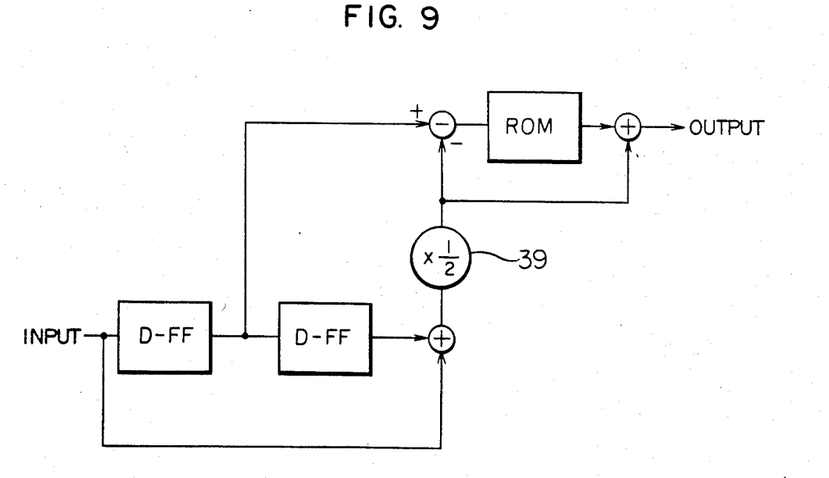
FIG. 9 is a schematic circuit diagram of a filter according to a further embodiment of the invention.

Although the time lag or delay involved in the operation of the device shown in FIG. 6 is small, as mentioned above, it suffers phase lag. FIG. 9 shows a configuration of the filter in which no phase lag takes place. In this figure, a reference numeral 39 denotes a multiplier having a multiplicand of $\frac{1}{2}$. Operation of this filter will be self-explanatory from the figure in consideration of the foregoing description.

Figure 10:
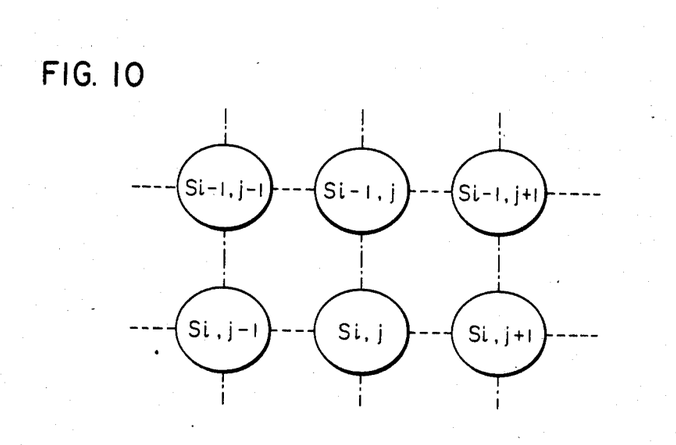
FIG. 10 is a diagram for illustrating locations of arrayed sample values.

Next, a two-dimensional filter will be elucidated. FIG. 10 is a diagram for two dimensional samples.

Figure 11:
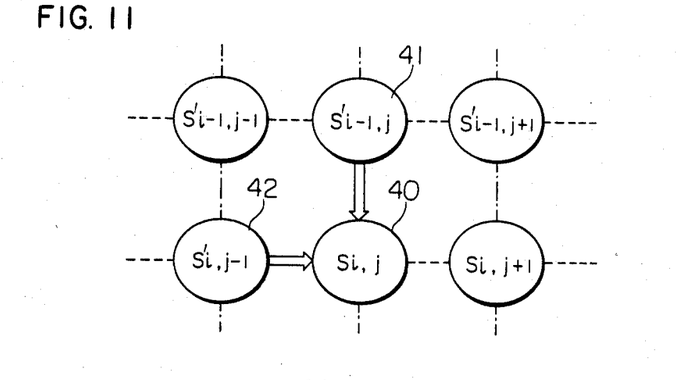
FIG. 11 is a diagram for illustrating filtering operation.

FIG. 11 is a diagram for illustrating a manner in which the sample values $(S_{i-1,j-1}, \ldots, S_{i,j+1})$ are filtered. In FIG. 11, $(S'_{i-1,j-1}, s'_{i-1,j+1}, S_{i,j-1})$ represent the sample values already filtered, while $(S_{i,j}, S_{i,j+1})$ represent the original sample values. Further, in FIG. 11, a numeral 40 designates a sample value to be filtered, and 41 and 42 designate the filtered sample values utilized in the filtering of the sample value 40.

Figure 12:
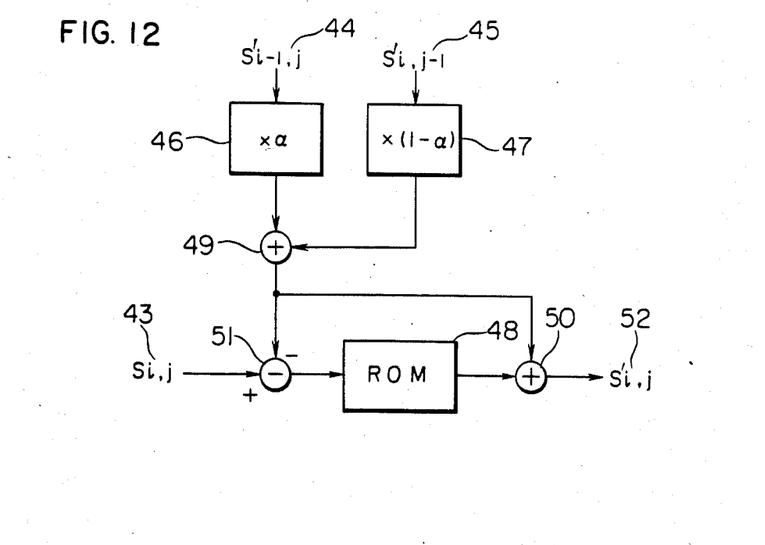
FIG. 12 is a schematic circuit diagram showing a filter according to a still further embodiment of the invention.

FIG. 12 shows a device configured to perform the filtering operation. In the figure, reference numerals 43, 44 and 45 denotes input units for the sample values 40, 41 and 42 shown in FIG. 11, respectively, 46 and 47 denote multipliers, respectively, 48 denotes a ROM, 49 and 50 denote adders, respectively, 51 denotes a subtractor, and a reference numeral 52 denotes an output unit of the sample value $S'_{i,j}$.

The sample values $S'_{i-1,j}$, $S'_{i,j-1}$ inputted through the input units 44 and 45 are multiplied with $\alpha$ (where $|\alpha|<1$) and $(1-\alpha)$ through the multipliers 46 and 47, respectively. The outputs of the multipliers 46 and 47 are added together by the adder 49. On the other hand, the result generated by the adder 49 is subtracted from the sample value $S_{i,j}$ inputted through the input unit 43. The output of the subtractor 51 is inputted to an address of the ROM 48, whereby the output of the ROM 48 is added with the output of the adder 49 by the adder 50, the resulting sum being supplied to the output unit 52.

Assuming that the contents of the ROM 48 can be represented by the expressions (1), (2) and (3) or correspond to those illustrated in FIG. 8, the output $S'_{i,j}$ of the device shown in FIG. 12 is given by $$S'_{i,j}=R(S_{i,j}-\alpha S'_{i-1,j}-(1-\alpha)S'_{i,j-1})+\alpha S'_{i-1,j}+(1-\alpha)S'_{i,j-1} \quad (10)$$

When $S_{i,j}-\alpha S'_{i-1,j}-(1-\alpha)S'_{i,j-1}$ is not large, the following expression applies valid:

$$R(S_{i,j}-\alpha S'_{i-1,j}-(1-\alpha)S'_{i,j-1})=S_{i,j}-\alpha S'_{i-1,j}-(1-\alpha)S'_{i,j-1} \quad (11)$$

Thus, $S'_{i,j}=S_{i,j}$ applies valid from the expression (10). This means that resolution of the image is prevented from degradation due to the filtering.

In the foregoing, three examples of filters are described. It should be understood that the principle of the filtering can be applied to the three-dimensional samples. Besides, the filter configuration is not restricted to those described above.

It should be mentioned that by using the filters described above, degradation produced on the block-basis upon steep variation of the samples can be successfully suppressed, assuring a significant improvement of the visual image quality. Further, the filter devices can be implemented in a much facilitated manner and operate on the real-time basis, to great advantages in the practical applications.

We claim:

1. A block encoder apparatus, comprising: first block generating means for constituting large-size blocks each composed of N sample points by dividing sample points of an image exhibiting continuity in three dimensional directions inclusive of a time-axis direction in a three-dimensional space; K varieties of second block generating means for dividing each of said large size blocks obtained by said first block generating means into small size blocks; block encoding means for generating K sets of block code words by block-encoding each of said K sets of small-size blocks obtained through said second block generating means; selecting means for selecting one set of the block code words from said K sets of the block code words obtained through said block encoding means; and transmitting means for transmitting said set of the block code words selected by said selecting means to receiver means and informing said receiver means of that one of said second block generating means which generated the transmitted set of the block code words.

2. A block encoder apparatus, comprising: first block generating means for constituting large-size blocks each composed of N sample points by dividing sample points of an image exhibiting continuity in three dimensional directions inclusive of a time-axis direction in a three-dimensional space; K varieties in total of second block generating means for dividing said large size block into two-dimensional small size blocks and second block generating means for dividing said large size block into three-dimensional small size blocks; block encoding means for generating K sets of block code words by block-encoding each of said K sets of small-size blocks obtained through said second block generating means; selecting means for selecting one set of the block code words from said K sets of the block code words obtained through said block encoding means; and transmitting means for transmitting said set of the block code words selected by said selecting means to receiver means and informing said receiver means of that one of said second block generating means which generated the transmitted set of the block code words.

3. A block encoder apparatus, comprising: first block generating means for constituting large-size blocks each composed of N sample points by dividing sample points of an image exhibiting continuity in three dimensional directions inclusive of a time-axis direction in a three-dimensional space; K varieties of second block generating means for dividing each of said large size blocks obtained by said first block generating means into small size blocks; block encoding means for generating K sets of block code words by block-encoding each of said K sets of small-size blocks obtained through said second block generating means; selecting means for selecting that set of the block code words which can ensure minimum distortion of the decoded original sample values from said K sets of the block code words obtained through said block encoding means; and transmitting means for transmitting said set of the block code words selected by said selecting means to receiver means and informing said receiver means of that one of said second block generating means which generated the transmitted set of the block code words.

4. A block encoder apparatus, comprising: first block generating means for constituting large-size blocks each composed of N sample points by dividing sample points of an image exhibiting continuity in three dimensional directions inclusive of a time-axis direction in a three-dimensional space; K varieties of second block generating means for dividing each of said large size blocks obtained by said first block generating means into small size blocks; block encoding means for generating K sets of block code words by block-encoding each of said K sets of small-size blocks obtained through said second block generating means; selecting means for selecting such set of the block code words in which transmission rate is constant in a predetermined range from said K sets of the block code words obtained through said block encoding means when encoded blocks of different code lengths are present among said K sets of the encoded blocks obtained through said block generating means; and transmitting means for transmitting said set of the block code words selected by said selecting means to receiver means and informing said receiver means of that one of said second block generating means which generated the transmitted set of the block code words.

5. A block encoder apparatus, comprising: first block generating means for constituting large-size blocks each composed of N sample points by dividing sample points of an image exhibiting continuity in three dimensional directions inclusive of a time-axis direction in a three-dimensional space; K varieties of second block generating means for dividing each of said large size blocks obtained by said first block generating means into small size blocks; block encoding means for generating K sets of block code words by block-encoding each of said K sets of small-size blocks obtained through said second block generating means; selecting means for selecting one set of the block code words from said K sets of the block code words obtained through said block encoding means; and transmitting/identifying means for transmitting said set of the block code words selected by said selecting means to receiver means together with information identifying that second block generating means which generated the transmitted set of the block code words.

6. A block encoder apparatus, comprising: first block generating means for constituting large-size blocks each composed of N sample points by dividing sample points of an image exhibiting continuity in three dimensional directions inclusive of a time-axis direction in a three-dimensional space; K varieties of second block generating means for dividing each of said large size blocks obtained by said first block generating means into small size blocks; block encoding means for generating K sets of block code words by block-encoding each of said K sets of small-size blocks obtained through said second block generating means in such a manner in which all of said K varieties of the block code words differ from one another; selecting means for selecting one set of the block code words from said K sets of the block code words obtained through said block encoding means; and transmitting means for transmitting said set of the block code words selected by said selecting means to receiver means.

7. A block encoder apparatus, comprising: filtering means disposed in precedence to encoding for suppressing steep variations among samples; first block generating means for constituting large-size blocks each composed of N sample points by dividing sample points of an image exhibiting continuity in three dimensional directions inclusive of a time-axis direction in a three-dimensional space; K varieties of second block generating means for dividing each of said large size blocks obtained by said first block generating means into small size blocks; block encoding means for generating K sets of block code words by block-encoding each of said K sets of small-size blocks obtained through said second block generating means; selecting means for selecting one set of the block code words from said K sets of the block code words obtained through said block encoding means; and transmitting/identifying means for transmitting said set of the block code words selected by said selecting means to receiver means and informing said receiver means of that one of said second block generating means which generated the transmitted set of the block code words.

8. A block encoder apparatus, comprising: adaptive filtering means including a delay element and a memory element and disposed in precedence to encoding for suppressing only those variations whose dynamic range is greater than a predetermined value; first block generating means for constituting large-size blocks each composed of N sample points by dividing sample points of an image exhibiting continuity in three dimensional directions inclusive of a time-axis direction in a three-dimensional space; K varieties of second block generating means for dividing each of said large size blocks obtained by said first block generating means into small size blocks; block encoding means for generating K sets of block code words by block-encoding each of said K sets of small-size blocks obtained through said second block generating means; selecting means for selecting one set of the block code words from said K sets of the block code words obtained through said block encoding means; and transmitting/identifying means for transmitting said set of the block code words selected by said selecting means to receiver means and informing said receiver means of that one of said second block generating means which generated the transmitted set of the block code words.

9. A block encoder apparatus, comprising: first block generating means for constituting large-size blocks each composed of N sample points by dividing sample points of an image exhibiting continuity in three dimensional directions inclusive of a time-axis direction in a three-dimensional space; K varieties in total of second block generating means for dividing said large size block into two-dimensional small size blocks and second block generating means for dividing said large size block into three-dimensional small size blocks; block encoding means for generating K sets of block code words by block-encoding each of said K sets of small-size blocks obtained through said second block generating means; selecting means for selecting a set of the block code words from said K sets of the block code words obtained through said block encoding means so that transmission rate is constant in a predetermined range when the code words of different lengths are present in said K varieties of the block code words; and transmitting and identifying means for transmitting said set of the block code words selected by said selecting means to receiver means and informing said receiver means of that one of said second block generating means which generated the transmitted block code words.

* * * * *